United States Patent [19]

Olashaw

[11] 4,360,857
[45] Nov. 23, 1982

[54] MODULAR INSULATIVE SUPPORT BASE FOR ELECTRICAL SWITCHGEAR

[75] Inventor: William F. Olashaw, Plainville, Conn.

[73] Assignee: General Electric Company, New York, N.Y.

[21] Appl. No.: 214,851

[22] Filed: Dec. 10, 1980

[51] Int. Cl.³ .............................................. H02B 1/20
[52] U.S. Cl. .................................... 361/361; 361/355; 174/71 B
[58] Field of Search ............... 361/341, 342, 346, 353, 361/355, 356, 358, 361, 363, 378, 429; 307/147; 339/22 B; 174/68 B, 70 B, 71 B, 72 B, 88 B, 99 B, 129 B, 133 B, 149 B

[56] References Cited

U.S. PATENT DOCUMENTS

| | | | |
|---|---|---|---|
| 3,780,355 | 12/1973 | Salvati | 361/342 |
| 3,924,161 | 12/1975 | Olashaw | 174/71 B |
| 4,242,718 | 12/1930 | Shariff | 361/361 |
| 4,288,656 | 9/1981 | Olashaw | 361/361 |
| 4,298,771 | 11/1981 | Olashaw | 361/355 |

Primary Examiner—G. P. Tolin
Attorney, Agent, or Firm—Richard A. Menelly; Walter C. Bernkopf; Fred Jacob

[57] ABSTRACT

A switchgear construction utilizes improved modular bases to serve as individual, insulative backwalls for the stacked array of cubicles in a vertical switchgear section. The back sides of the bases, assembled to the switchgear frame in end-to-end vertical relation, are channelled to receive and mount H-shaped vertical busbars in electrically isolated, side-by-side relation. Apertures in the bases accommodate electrical connections of device line terminal run-in straps with the vertical bus, and the rearward extension of device load terminal runbacks which isolatively pass through openings in the vertical bus. The vertical bus, the horizontal bus, and the bus joints therebetween are completely isolated from external contact.

8 Claims, 21 Drawing Figures

MODULAR INSULATIVE SUPPORT BASE FOR ELECTRICAL SWITCHGEAR

BACKGROUND OF THE INVENTION

The present invention relates to electrical switchgear and particularly to a modular base which is assembled with like bases in end-to-end vertical relation to the frame of a switchgear vertical section such as to provide insulative rear barrier walls for the various cubicles to one side thereof and to provide electrically isolated support for plural vertical busbars to the other side thereof.

The subject modular insulative support base is analogous to the modular mounting panel disclosed and claimed in commonly assigned U.S. Pat. No. 4,031,433 and is uniquely structured for application in the larger size switchboards commonly referred to as "switchgear". Generally speaking, switchgear involves electrical distribution equipment of extreme short-circuit current withstand and thus the electrical devices, buswork, etc., are of greater physical size and weight. Thus, extra attention must be given to accommodating and supporting the greater component size and weight, as well as to insulating and isolating live parts from each other and from inadvertent contact by operating and maintenance personnel.

It is accordingly an object of the present invention to provide an improved insulative support base for electrical switchgear.

A further object is to provide a support base of the above character which is of modular construction such that plural bases may be mounted to a switchgear frame in interfitting, vertical end-to-end relation to serve as individual backwalls for a stacked array of cubicles in a switchgear vertical section.

Another object is to provide modular support bases of the above character having the requisite physical strength to mount the vertical busbars of a switchgear vertical section in insulated/isolated side-by-side parallel relation.

An additional object is to provide support bases of the above character which are individually apertured to accommodate and support run-in straps in respective, electrical connection with the vertical bus and to which the live terminals of electrical devices within the cubicles electrically connect.

Yet another object is to provide support bases of the above character which support runback straps to which the load terminals of electrical devices within the cubicles electrically connect and which extend rearwardly through apertures in the bases and insulatively through openings in the vertical bus.

An additional object is to provide support bases of the above character which are structured to provide side-by-side channels in their back sides for accommodating and supporting H-shaped vertical busbars.

Yet another object is to provide a support base of the above character which is efficient in construction and convenient to assemble to a switchgear frame.

Other objects will in part be obvious and in part appear hereinafter.

SUMMARY OF THE INVENTION

In accordance with the present invention, there is provided improved electrical distribution equipment, in particular electrical switchgear, which utilizes modular, structurally rigid, insulative support bases which are assembled to a switchgear frame in end-to-end vertical relation to serve as a succession of rear barrier walls for a stacked array of switchgear cubicles, as well as to insulatively support the switchgear buswork. Each support base is integrally formed with a plurality of vertically elongated, laterally spaced, parallel walls outstanding from its back side to define at least three side-by-side channels in which H-shaped vertical busbars, of the switchgear buswork are individually accommodated. A pair of parallel running troughs are created in the floor of each channel to accept the forwardly extending portions of the vertical busbar flanges, while the web joining the flanges in H cross-sectional configuration rests against the channel floor.

In the front side of each base there is formed a set of at least three transversely aligned, line-side depressions, each straddled by the troughs in the opposed channel and including an opening exposing the web of the H-shaped vertical busbar therein. These depressions accommodate run-in electrical connectors which are electrically connected to the exposed vertical busbar webs and physically supported by the base in positions to make electrical connections with the line terminals of an electrical device accommodated in the associated cubicle. Vertical patterns of holes performed in the channel floors register with preformed holes in the vertical busbar webs such as to accommodate bolts clamping the vertical busbars in their respective channels. Preferably these preformed bolt holes in the base are countersunk from the front side so as to accept insulative caps isolating the line bolt heads.

Also formed in the front side of each base is a set of three transversely arranged load-side depressions in respective vertically spaced relation with the line-side depressions. Each of these load-side depressions is likewise straddled by the troughs in the opposed channel and communicate with the open interior of a sleeve integrally formed with the base to extend rearwardly into the opposed channel through a gap in the web of the vertical busbar therein. Supported in each load-side depression is a runback electrical connector which extends rearwardly through the associated sleeve in isolated relation with the vertical busbar in the opposed channel. The forward ends of these runback connectors are disposed to make electrical connection with the electrical device in the associated cubicle.

To enhance the isolating capacity of the support bases, their upper and lower edges are provided with tongue and groove formations which interfit when the bases are assembled in end-to-end vertical relation. Also, transverse walls outstanding from the front side of each base along its upper and lower edges cooperate with horizontal barrier panels to afford complete separation between vertically adjacent cubicles.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several views of the drawings.

DETAILED DESCRIPTION

Figure 1:
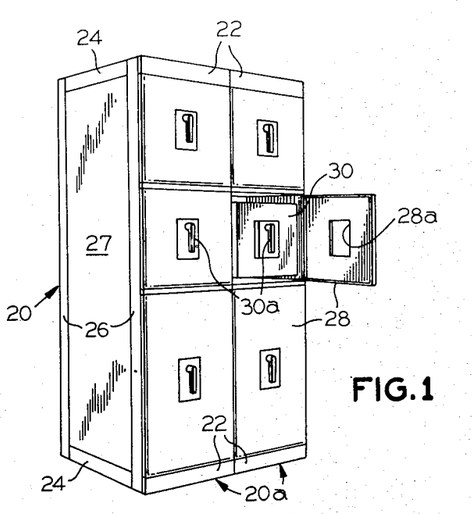
FIG. 1 is a perspective view of an electrical switchgear including a pair of side-by-side vertical sections.

The present invention is embodied in an electrical switchgear, generally indicated at 20 in FIG. 1 and comprising one or more vertical sections 20a. Each vertical section includes a cubical steel framework consisting of width posts 22, depth posts 24 and vertical posts 26 rigidly joined at the frame corners in mutually perpendicular relation. Secured to these posts are suitable panels, such as side panel 27 seen in FIG. 1, to provide a cubical enclosure, as well as partitions to create individual compartments or cubicles accessed by doors 28 hinged to the vertical posts. Within each cubicle is an electrical device, such as a circuit breaker 30 whose operating handle 30a protrudes through a central opening 28a in the cubicle door.

Figure 2:
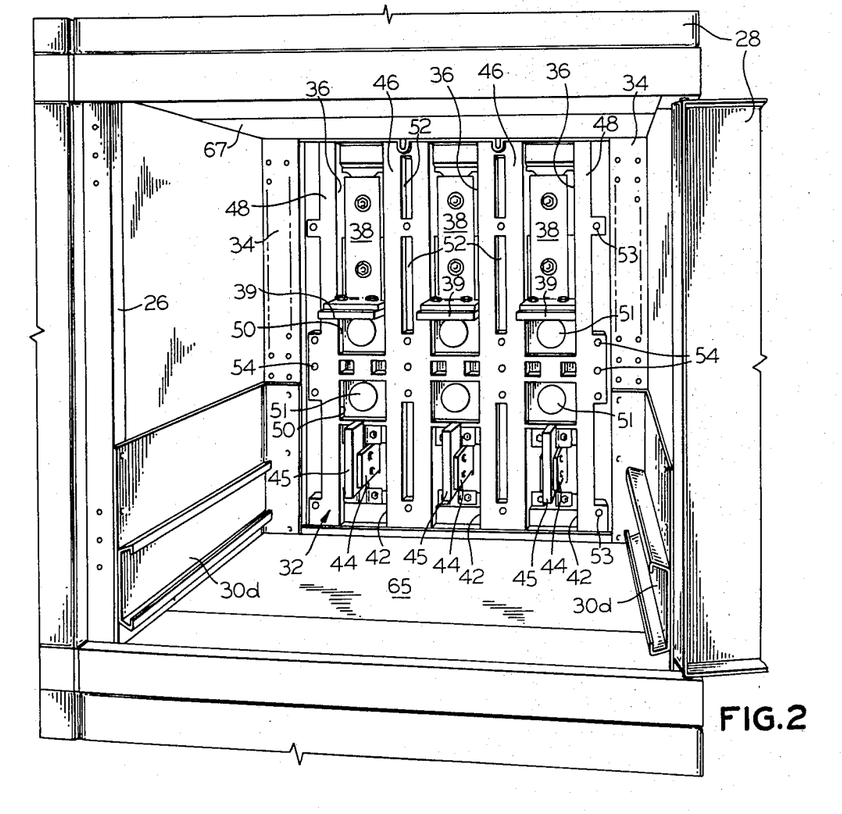
FIG. 2 is a perspective view looking into one of the cubicles of the switchgear of FIG. 1.
Figure 8:
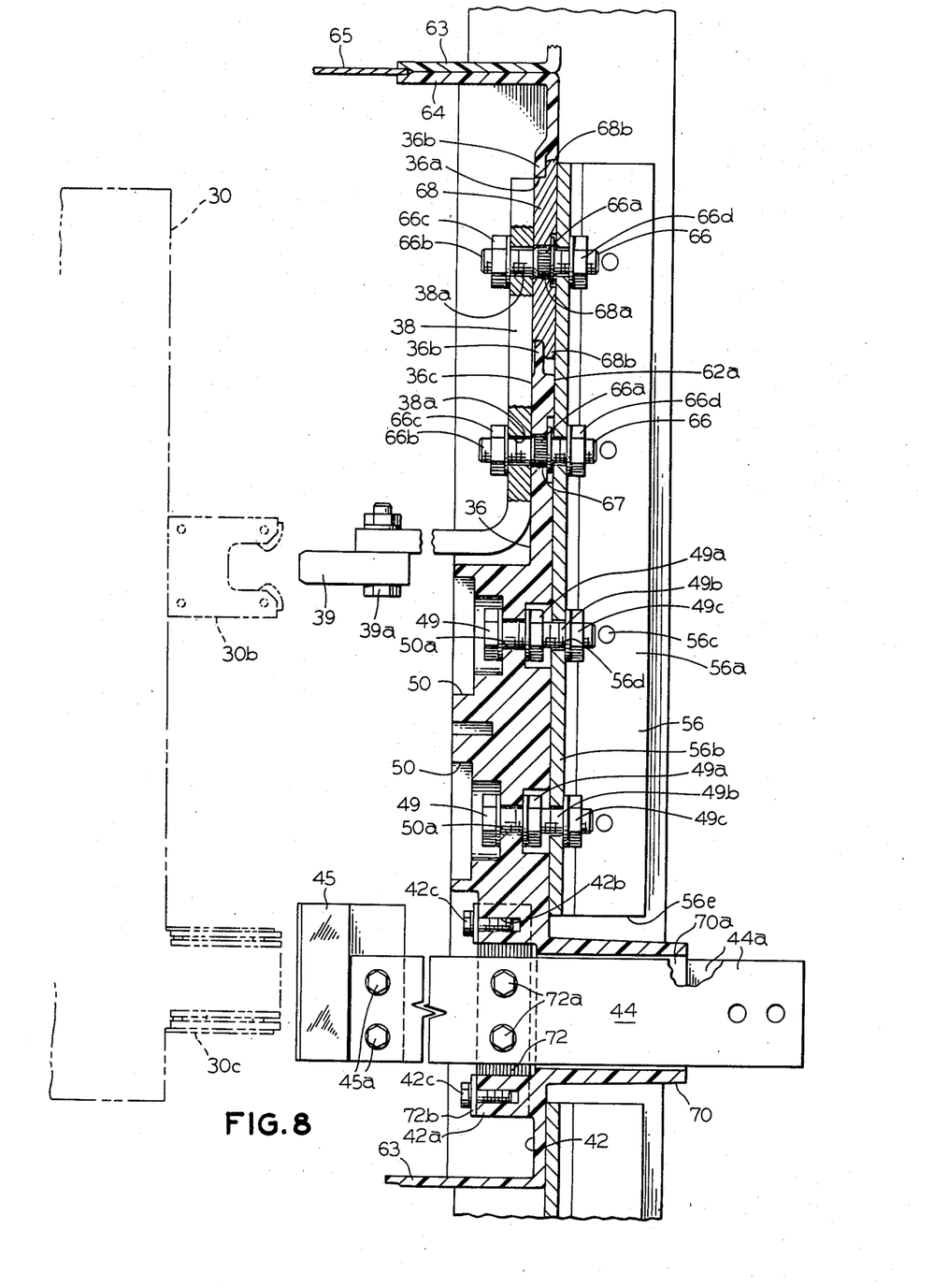
FIG. 8 is a vertical sectional view taken along the centerline of one of the riser busbar channels provided in the rear face of the base of FIG. 3.

Looking into a representative cubicle of one of the switchgear vertical sections, as seen in FIG. 2, the rear wall thereof is provided by a modular support base, generally indicated at 32, of a structurally rigid, electrically insulative material, such as glass fiber polyester, formed, for example, by a molding process. These bases are mounted in end-to-end vertical relation to vertical stringers 34 by self-tapping screws 35 utilizing vertical patterns of holes 35a preformed in the lateral edge portions of the bases (FIG. 5); the stringers being affixed to the switchgear section framework at an appropriate depth. As seen in both FIGS. 2 and 3, the front face of each base is formed to provide three rectangular, vertically elongated, relatively deep depressions 36, in side-by-side relation for accommodating L-shaped, run-in line straps 38 (FIG. 2) which are respectively electrically connected with separate vertical or riser busbars and, together with these riser busbars, are physically mounted to the base, as will be described in connection with FIG. 8. Also formed in the front side of base 32 in vertical alignment below depressions 36 are side-by-side depressions 42 in which are mounted load-side runbacks 44, as will be detailed in conjunction with FIGS. 8 through 10. The line straps 38 are electrically joined with and physically support separate male stabs 39 using bolts 39a, while the runbacks 44 physically mount and are electrically joined by bolts 45a with separate male stabs 45. These stationary male stabs are disposed to mate with line terminal disconnects 30b and load terminal disconnects 30c of a drawout circuit breaker 30, as seen in FIG. 8; racking movement of the breaker being supported by side rails 30d seen in FIG. 2.

Figure 3:
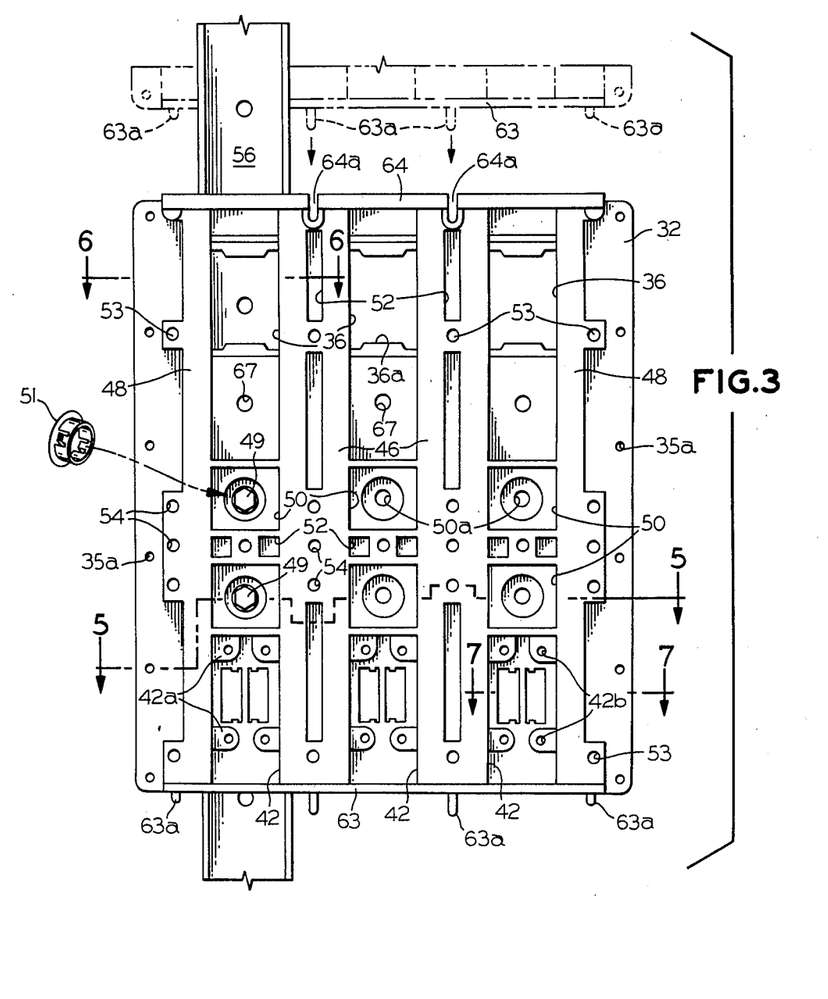
FIG. 3 is a front view of a modular insulative support base utilized in the switchgear of FIG. 1.

Still referring to FIGS. 2 and 3, interphase isolation is provided by the base in the form of a pair of barrier walls 46 separating depressions 36 and 42, while phase to frame isolation is afforded by outboard barrier walls 48. A pair of rectangular wells 50 located between each vertically spaced pair of depressions 36 and 42 serve to recess the heads of bolts 49 securing the riser busbars to the base 32, as also will be seen in connection with FIGS. 5 and 8. The bolt heads, being live, are isolated by caps, one seen at 51 in FIG. 3, which are press-fitted in the countersunk portions of the bolt holes 50a preformed in the base. Rectangular recesses 52 in the front surface of the base constitute coring, while appropriately located, preformed holes 53 may be utilized to mount current transformers (not shown) in embracing relation with either the line straps 38 or the runbacks 44 of each phase. The horizontal pattern of preformed holes 54 may be utilized to secure a transverse brace (not shown) to each base should additional bracing be needed to withstand the extreme electrodynamic forces associated with extraordinarily high levels of short-circuit fault current.

Figures 11, 12, 13, 14:
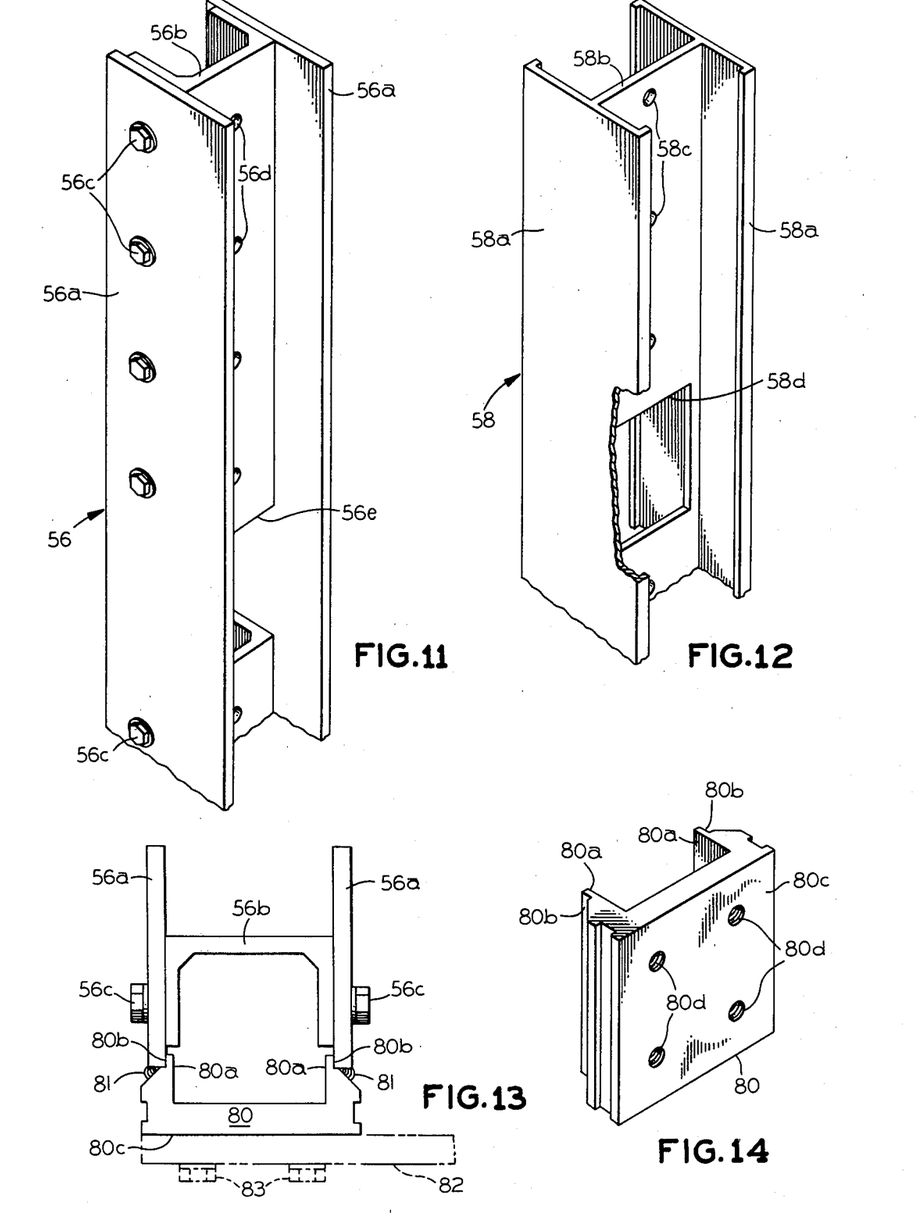
FIG. 11 is a perspective view, partially broken away, of a copper riser busbar utilizable in the switchgear of FIG. 1.
FIG. 12 is a perspective view, partially broken away, of an extruded aluminum riser busbar utilizable in the switchgear of FIG. 1.
FIG. 13 is a plan view of an electrical joint between a horizontal busbar and the riser busbar of FIG. 11.
FIG. 14 is a perspective view of the power connector utilized in the bus joint of FIG. 13.

As will be described, bases 32, once mounted to the switchgear frame in end-to-end vertical relation, serve to support in parallel, side-by-side, isolated relation typically three vertical or riser busbars, which are seen in FIGS. 11 and 12 to be of H-shaped cross-section. The riser busbar 56 of FIG. 11 is formed of copper with its H-shaped cross-section created by assembling a pair of copper rectangular cross-sectioned bars or flanges 56a to a series of interconnecting U-shaped copper webs 56b utilizing bolts 56c. FIG. 12 depicts an alternative, aluminum busbar 58 extruded in H-shaped cross-section with flanges 58a interconnected by an integral web 58b. As will be seen, a series of holes 56d preformed in the separate webs 56b of each copper riser busbar or the preformed holes 58c in the web of each aluminum busbar are utilized in affixing the riser busbars to the bases 32 and to accommodate bolted joints with line straps 38 (FIGS. 2 and 3). The separations 56e between the copper busbar webs 56b and the openings 58d created in the aluminum busbar web 58b are so located as to accommodate the rearward extension of runbacks 44, as will be described.

Figure 4:
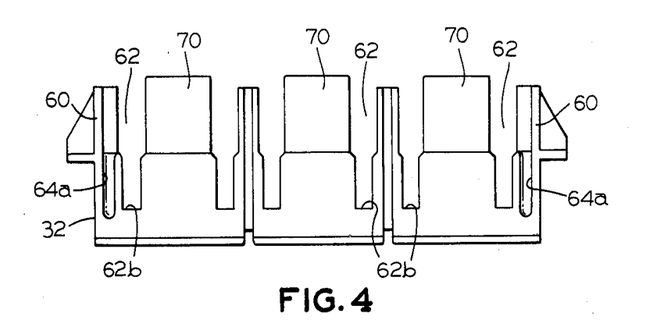
FIG. 4 is an end view of the support base of FIG. 3.
Figure 5:
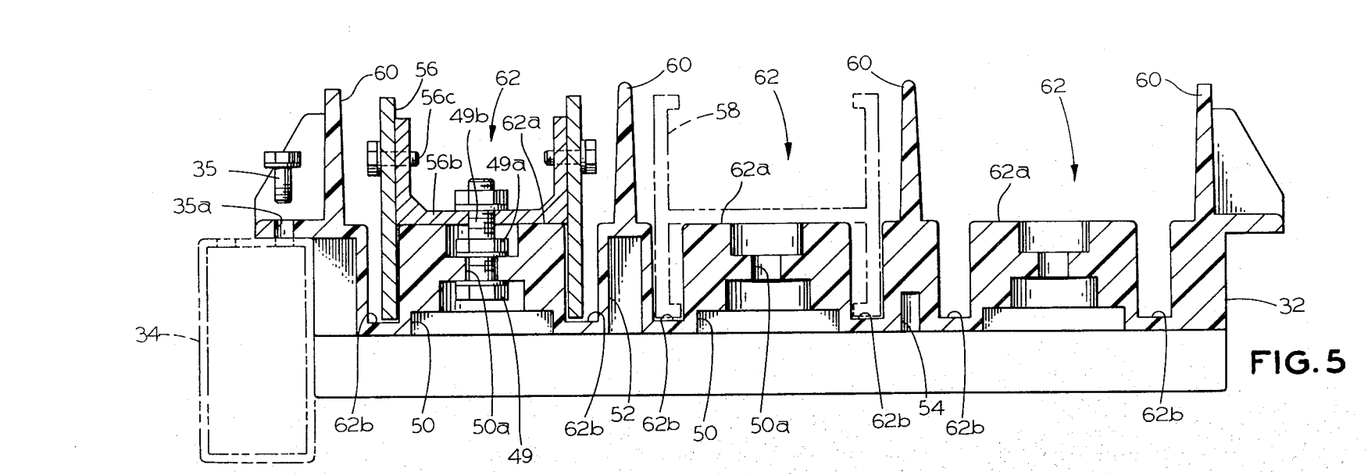
FIG. 5 is a sectional view taken along line 5—5 of FIG. 3.

Referring to FIGS. 4 and 5, the back side of each base 32 is integrally formed with four outstanding, vertically extending walls 60 arranged in equally spaced, parallel relation such to define three channels 62 coextensive with the length of each base. When the bases are assembled in vertical, end-to-end relation to stringers 34 (FIG. 2), these channels are continuous for the full height of the switchgear vertical section. In this connection, as seen in FIG. 3, the lower edge of each base is provided with tongues 63a which interfit with grooves 64a created in the upper edge of each base incident to their end-to-end assembly. Also as seen in FIGS. 3 and 8, a transverse wall 64 outstanding from the front side of each base at its upper edge and a transverse wall 63 outstanding from its lower edge cooperate with partitions 65, seen in FIGS. 2 and 8, in fully separating vertically adjacent cubicles.

Returning to FIG. 5, the floor 62a of each channel 62 is formed with a pair of deep, parallel running troughs 62b which receive the forwardly extending portions of the copper busbar flanges 56a or the aluminum busbar flanges 58a depending on which of the H-shaped riser busbars 56 or 58 are laid in the channels. While FIG. 5 shows a copper riser busbar 56 laid in the left channel 62 and an aluminum riser busbar 58 in the center channel, it will be appreciated that for a particular installation the riser bus will either be all copper or all aluminum. The width of the troughs 62b is illustrated as being greater than the flange thickness to show that flanges of increased thickness and greater ampacity can be accommodated. The depth of the troughs 62b is such that the forward edges of the riser bus flanges are spaced from the groove bottoms while the busbar webs rest on the channel floors 62a, as illustrated in FIG. 5. Centrally located in the wells 50 noted in FIGS. 2 and 3 are the preformed through-holes 50a, countersunk from both sides, for accommodating the bolts 49 inserted from the front side of the base (see also FIG. 8). Nuts 49a are then threaded down on the bolt shanks 49b so as to clamp the bolts to the base with their shanks projecting out beyond the floors 62a of their respective channels 62. Thus, when the riser busbars are laid in the channels the bolt shanks 49b project through the preformed holes in the busbar webs. Second nuts 49c are then torqued down on these bolt shanks to securely clamp the riser busbars, either the copper busbars 56 as seen in FIG. 5 of the aluminum busbars 58, to the bases 32.

Figure 6:
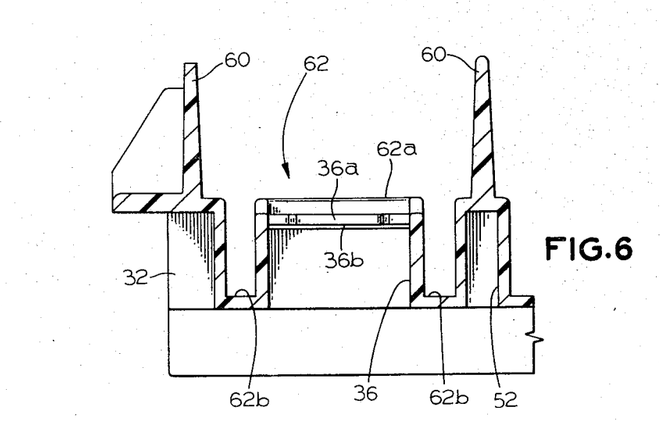
FIG. 6 is a sectional view taken along line 6—6 of FIG. 3.

In addition to bolts 49, a pair of spline bolts 66 are utilized to further secure each riser bus to the bases 32 and also to support and electrically connect an L-shaped line strap 38 to each riser busbar, which in FIG. 8 is seen to be a copper busbar 56. Thus, one of each pair of spline bolts 66 has its intermediate spline portion 66a swaged into a preformed hole 67 located in the lower portion of each line strap depression 36 formed in the front side of base 32. The other one of each spline bolt pair has its spline portion 66a swaged into a countersunk hole 68a formed in a rectangular copper spacer 68 which is accommodated in a close-fitting opening 36a in the channel floor 62a otherwise separating each front side line strap depression 36 from its associated riser bus channel 62. The upper and lower edges of opening 36a are forwardly offset to create lips 36b (see also FIG. 6) which cooperate with upper and lower spacer projections 68b to seat spacer 68 with its rear surface flush with the channel floor 62a and its front surface flush with the bottom surface 36c of line strap depression 36. The forwardly extending threaded shanks 66b of spline bolts 66 are inserted through holes 38a in line strap 38 and nuts 66c are applied to clamp the line strap to the base and to effect a bolted electrical joint with spacer 68. The rearwardly extending threaded shanks of the spline bolts project through the copper riser bus web holes 56d to receive nuts 66d further clamping the riser bus to the base and effecting a bolted electrical joint with spacer 68.

When aluminum riser busbars 58 are utilized, their electrical joints with the line straps or run-ins may be of a bolted-welded configuration, such as disclosed in commonly assigned, U.S. Pat. No. 4,288,656.

Figure 7:
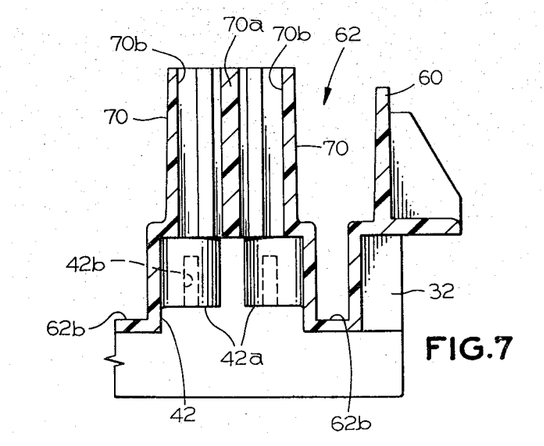
FIG. 7 is a sectional view taken along line 7—7 of FIG. 3.
Figure 9:
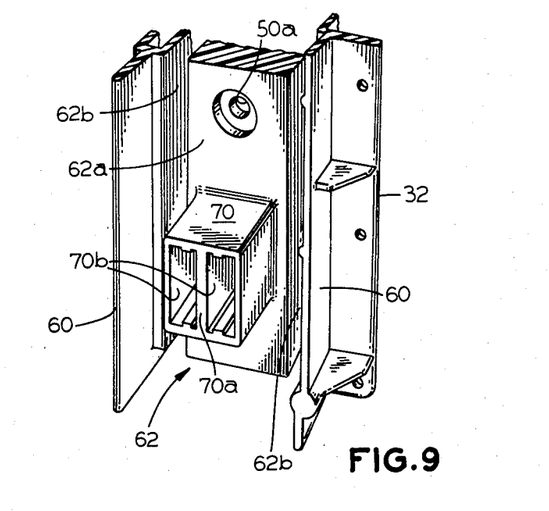
FIG. 9 is a fragmentary perspective view of the runback supporting portion of the base of FIG. 3.
Figure 10:
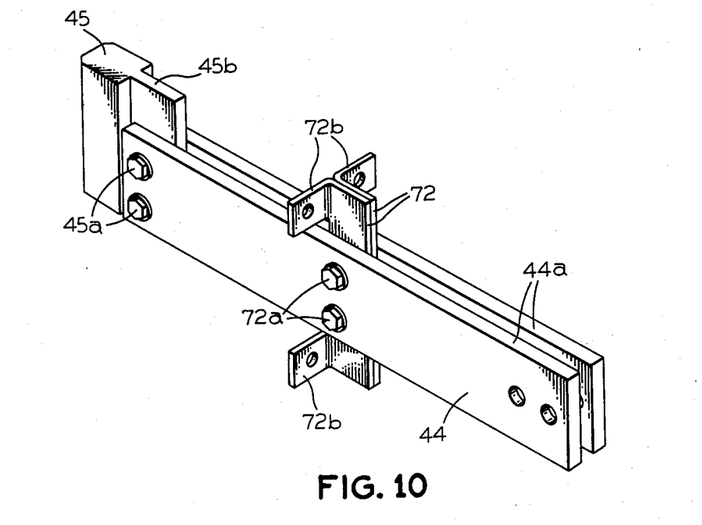
FIG. 10 is a perspective view of one of the runbacks utilized in the switchgear of FIG. 1.

To isolate the rearward extensions of runbacks 44 from the riser busbars, the base is integrally formed with a rearwardly extending, rectangular sleeve 70 outstanding from the floors 62a of each channel 62, as seen in FIGS. 7, 8 and 9. Riser bus clearance for these sleeves is afforded by the gaps 56e in the copper busbar webs 56b (FIG. 11) or the openings 58d in the aluminum busbar webs 58b (FIG. 12). An integral, vertically oriented partition 70a divides the sleeve interior into two rectangular passageways 70b, as best seen in FIGS. 7 and 9, which open into associated depression 42 in the front side of base 32. As seen in FIG. 10, each runback is constituted by a pair of copper bars 44a whose forward terminations are clamped by bolts 45a in electrical connection with an intervening tongue 45b integrally formed with male stab 45. At an appropriate intermediate point, a pair of brackets 72 are clamped together between the runback bars by bolts 72a to thus create a runback assembly with bars 44a secured in closely spaced, parallel relation. Each bracket is equipped with a pair of laterally turned, apertured ears 72b which rest on four pedestals 42a outstanding from the floor of each depression 42, as best seen in FIG. 3, when the runback assemblies are inserted through sleeves 70 from the front side of the base. As seen in FIG. 8, self-tapping screws 42c are driven into blind holes 42b formed in these pedestals to clamp ears 72b thereto and, in turn, secure the runback assemblies to base 32.

The utilization of a pair of bars in each runback 44 is seen to promote more secure support of the runbacks by the base; the sleeve partitions 70a being a significant factor in this regard. Moreover, greater conductor surface area is created to afford increased current carrying capacity without having to enlarge the vertical dimension of the runback conductors. As seen in FIG. 10, the rearward terminations of the runback bars 44a are apertured for bolted electrical connection with cable bus connectors (not shown), which, incidentally, further serve to secure the bars in parallel, closely spaced relation.

Figure 15:
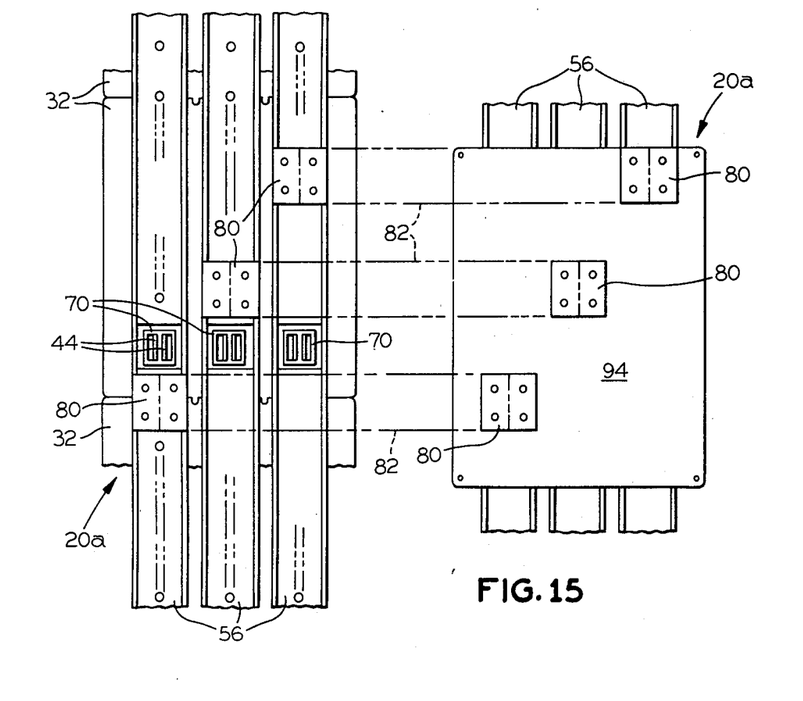
FIG. 15 is a simplified elevational view illustrating the horizontal bus runs interconnecting adjacent switchgear vertical sections.

In FIGS. 13 and 14 there is illustrated a power connector 80 which is utilized to make the electrical connections or bus joints between the copper riser busbars 56 of FIG. 11 and horizontal busbars 82 which in FIG. 15 are seen to run between corresponding riser busbars of adjacent switchgear vertical sections 20a (FIG. 1) and to a power source (not shown) feeding the switchgear sections in parallel. The connectors are generally U-shaped having legs 80a appropriately relieved, as indicated at 80b, to seat on the rearward edges of the riser bus flanges 56a. Weld fillets 81 are then laid down to join the connector legs with the riser bus flanges pursuant to creating a welded electrical joint between the power connector and the riser busbar. The planar rearwardly facing surface 80c of the power connector is provided with tapped bores 80d accommodating bolts 83 for effecting a bolted electrical joint between the power connector and a horizontal busbar 82. In the case of the aluminum riser busbars, electrical joints with the horizontal busbars may be effected in the manner disclosed in commonly assigned, U.S. Pat. No. 4,298,771 the disclosure of which is specifically incorporated herein by reference.

Figure 16:
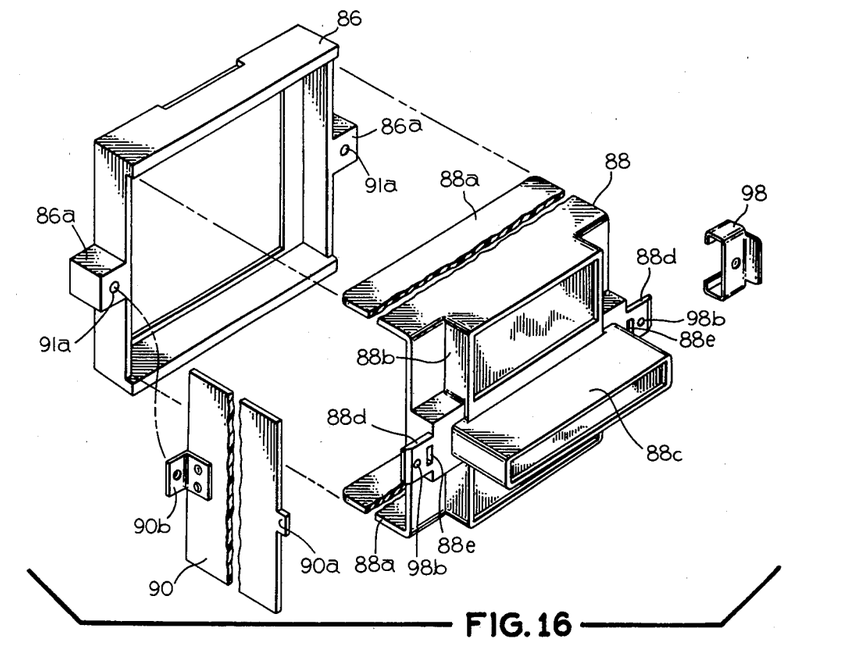
FIG. 16 is an exploded perspective view of an isolating enclosure for the bus joint of FIG. 13.
Figures 17, 20, 21:
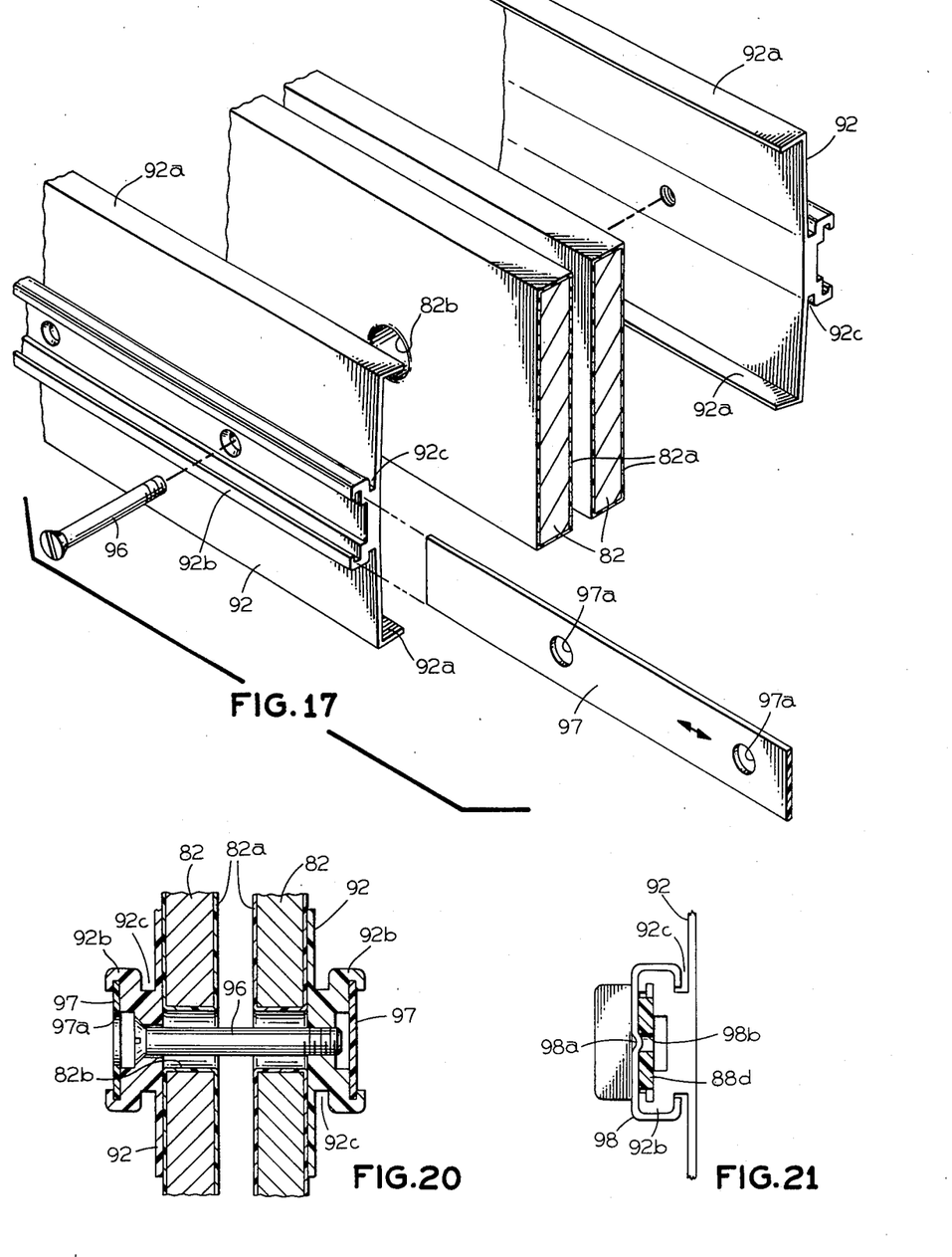
FIG. 17 is an exploded, fragmentary perspective view illustrating the assembly of isolating barriers to the horizontal bus runs of FIG. 15.
FIG. 20 is a sectional view taken along line 20—20 of FIG. 19.
FIG. 21 is a sectional view taken along line 21—21 of FIG. 19.
Figure 18:
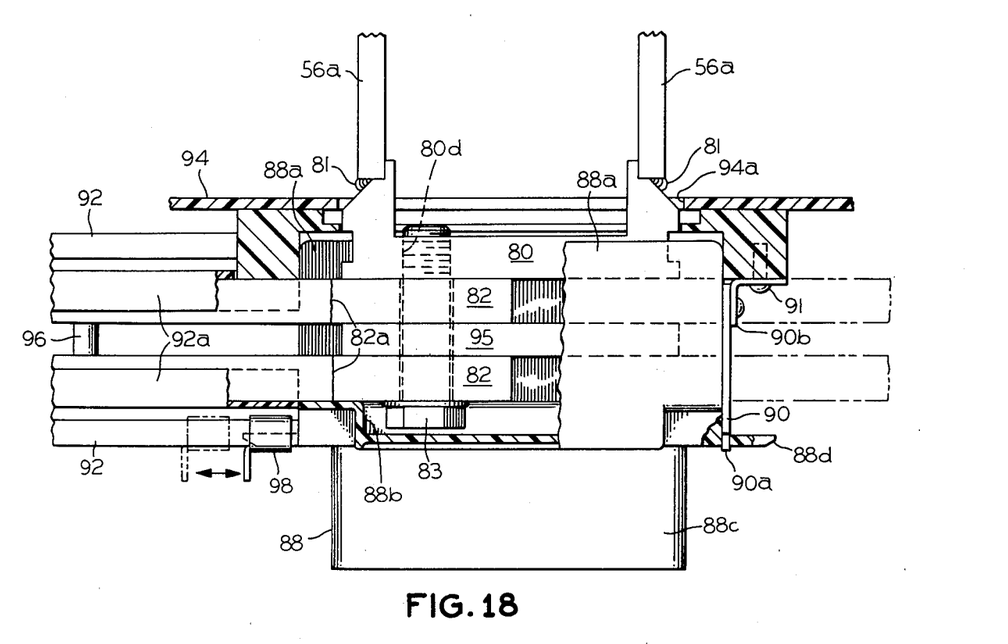
FIG. 18 is a plan view, partially broken away, of the bus joint of FIG. 13 as adapted with the isolating enclosure of FIG. 16 and a horizontal bus run as adapted with the isolating barriers of FIG. 17.
Figure 19:
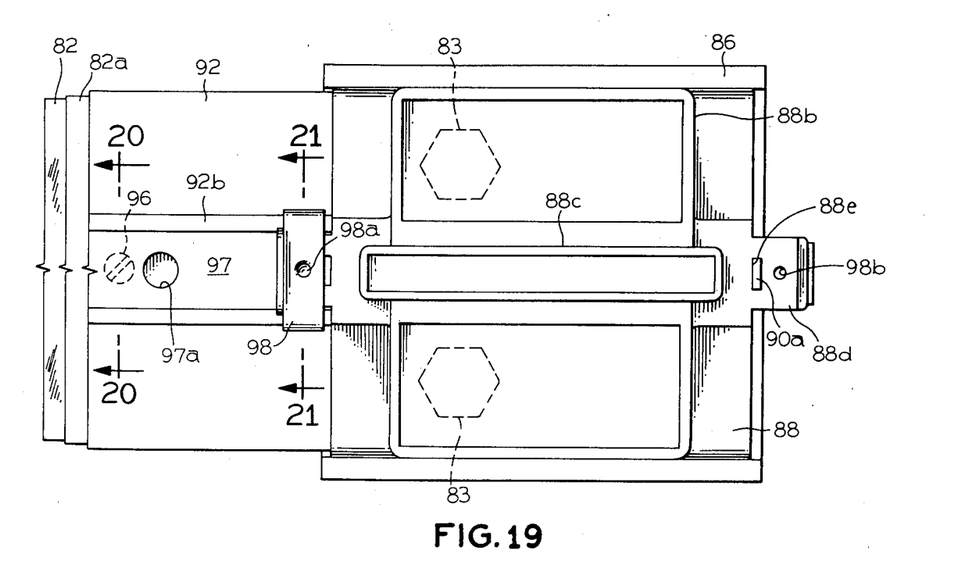
FIG. 19 is an elevational view of the isolated bus joint and horizontal bus run of FIG. 18.

To isolate the riser-horizontal bus joints from contact by humans and foreign objects, an insulative enclosure therefor, seen in FIGS. 16, 18 and 19, is provided. This enclosure is constituted by a molded rectangular collar 86, a molded cover 88, and, in those situations where a horizontal bus run terminates at a particular power connector, an end panel 90. To protect and isolate the horizontal bus runs between power connectors, a pair of elongated, insulative barriers 92, best seen in FIG. 17, are assembled in partially enclosing relation thereto. Finally, to isolate the riser busbars, a barrier sheet 94, seen in FIG. 15, is secured to the back side of each base 32 to close off the riser bus channels 62. Rectangular openings 94a (FIG. 18) in the barrier sheet provide clearance for the power connectors 80 so that the welded joints between the power connectors and the riser busbars may be made before the barrier sheet is secured to the base.

Before the joint between the power connectors and the horizontal busbars 82 are made, collars 86 of the bus joint enclosures are slipped over the power connectors. Once the bus joints are made, covers 88 are applied. From FIGS. 16 and 18, it is seen that the upper and lower skirts 88a of the cover underlap the upper and lower sidewalls of the collar to fully isolate the bus joint from above and below. The length of these skirts is made sufficient to isolate bus joints involving double-bar horizontal bus runs, as seen in FIG. 18. A conductive spacer 95 is incorporated in the bus joint to maintain the horizontal busbars in closely spaced, parallel relation for high ampacity, cool running performance. The face of the cover is formed having a rectangular cavity 88b to afford clearance for the heads of the joint bolts 83. Also molded into the cover face is a rectangular, horizontally elongated, hollow extension 88c which serves to accommodate the projection flange of the aluminum power connector utilized in the bolted-welded aluminum bus joint of the above-noted U.S. Pat. No. 4,298,771. Extension 88c also serves as a convenient handle for safely removing the cover for in-service joint inspection. To accommodate those situations where the horizontal bus run terminates at a bus joint, collar 86 is molded with opposed, laterally extending ears 86a, while the cover is molded with opposed, laterally extending tangs 88d having a slot 88e therein. Panel 90 is equipped with a projection 90a, which is inserted in this tang slot, and an L-shaped bracket 90b, which is apertured to receive a screw 91 (FIG. 18) threaded into a bore 91a provided in collar ears 86a. The panel 90, thus assembled to the bus joint enclosure, effectively closes off the otherwise open side of the enclosure beyond the horizontal bus run termination to isolate the bus joint from inadvertant human contact.

Turning to FIG. 17, except for their terminations, the surfaces of the individual horizontal busbars 82 are coated with a layer 82a of primary insulation which also covers the surfaces of holes 82b punched therein. As seen in FIG. 20, these holes provide clearance for a series of screws 96 serving to clamp barriers 92 against the front and back sides of the horizontal busbars throughout their runs between bus joints. As seen in FIG. 18, the upper and lower skirts 92a of these barriers do not close off the gap between the horizontal busbars so as not to obstruct connection cooling thereof. The primary purpose of these barriers is to protect the busbar primary insulation 82a from impact damage, and thus are preferably formed of high impact resistant plastic material.

The barriers are molded with co-extensive track 92b configured to slidingly receive an insulative strip 97 effective in concealing screws 96 when positioned with its access holes 97a in non-registry with the screw heads, as seen in FIG. 19.

To interconnect the horizontal bus run barriers with the bus joint enclosure, barrier track 92b is formed with opposed undercuts 92c (FIGS. 17 and 21) serving to slidingly mount a clip 98, also seen in FIGS. 18 and 19. With joint enclosure cover 88 in place, its tangs 88d are received in the recessed portion of tracks 92b on barriers 92 to each side of the bus joint. The clips are then slid toward the bus joint to capture the tangs and hold cover 88 in place. To preserve the captive positions of the clips, they are dimpled, as indicated at 98a in FIG. 21, for detenting engagement with holes 98b molded into the tangs.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In an electrical distribution equipment utilizing H-shaped vertical busbars for distributing electrical power to a plurality of loads via electrical devices accommodated in a stacked array of cubicles, a plurality of modular, structurally rigid, insulative support bases, each comprising in combination:

A. a rectangular, generally planar structure having marginal side edge portions for mounting said bases to the equipment framework in vertical end-to-end relation such as to constitute a succession of cubicle backwalls;

B. a plurality of integral, vertically elongated, laterally spaced, parallel walls outstanding from the back side of said base to define at least three side-by-side channels in which the vertical busbars are individually accommodated;

C. means forming a pair of parallel running troughs in the floor of each said channel accepting the forwardly extending portions of the H-shaped vertical busbar flanges while the flange interconnecting web thereof rests against said channel floor;

D. means forming a set of at least three transversely aligned, line-side depressions in the front side of said base, each said depression being straddled by said pair of troughs in a different one of said channels, each said depression including an opening into its associated channel floor to expose the vertical busbar web thereat for electrical connection with a run-in electrical connector;

E. means forming a set of at least three transversely aligned load-side depressions in the front side of said base in aligned, vertically spaced relation with said line-side depressions, each said load-side depression communicating with the open interior of a sleeve integrally formed with said base and extending rearwardly into the associated one of said channels through a gap in the web of the vertical busbar therein;

F. vertical arrays of preformed holes in the floors of said channels which accomodate bolts clamping the webs of the vertical busbars to said base; and G. means provided in said load-side depressions for mounting runback connectors extending rearwardly through said sleeves in isolated relation with the vertical busbars.

2. The combination defined in claim 1, which further comprises continuous ledges outstanding from the front side of each said base and extending transversely along the upper and lower edges of said base, said continuous ledges of vertically adjacent bases cooperating with a partition to fully separate vertically adjacent cubicles.

3. The combination defined in claims 1 or 2, which further includes tongue and groove formations on the upper and lower edges of each base which interfit.

4. The combination defined in claim 1, wherein at least some of said preformed holes are countersunk from the front side of said base and accommodate press-fitted, insulative caps isolating the heads of the vertical busbar clamping bolts.

5. The combination defined in claim 1, wherein said runback connector mounting means in said load-side depressions includes integral pedestals having preformed holes therein to accept screws securing the runback connectors in position via brackets affixed thereto.

6. The combination defined in claim 5 wherein the runback connectors are each in the form of a pair of elongated bars clamped in closely spaced parallel relation, each said sleeve integrally formed having a partition creating separate passageways individually accommodating the rearward extensions of the pair of runback connector bars.

7. The combination defined in claim 1, wherein said openings in said line-side depressions include edge formations for capturing conductive spacer elements, whereby said run-in connectors and spacer elements are supported by said base as separate units.

8. The combination defined in claims 5, 6 or 7, which further comprises continuous ledges outstanding from the front side of each said base and extending transversely along the upper and lower edges of each said base, said continuous ledges of vertically adjacent bases cooperating with a partition to fully separate vertically adjacent cubicles.

* * * * *